United States Patent [19]

Purcell et al.

[11] 4,369,636

[45] Jan. 25, 1983

[54] METHODS AND APPARATUS FOR REDUCING HEAT INTRODUCED INTO SUPERCONDUCTING SYSTEMS BY ELECTRICAL LEADS

[75] Inventors: John R. Purcell; Wilkie Y. Chen, both of San Diego; Walter E. Toffolo, Solana Beach, all of Calif.

[73] Assignee: General Atomic Company, San Diego, Calif.

[21] Appl. No.: 280,325

[22] Filed: Jul. 6, 1981

[51] Int. Cl.³ .............................................. F25B 19/00
[52] U.S. Cl. ...................................... 62/514 R; 62/49; 174/15 CA; 335/216
[58] Field of Search .......................... 62/49, 54, 514 R; 174/15 CA; 335/216

[56] References Cited

U.S. PATENT DOCUMENTS

| | | | |
|---|---|---|---|
| 3,588,312 | 2/1971 | Burnier | 62/514 R |
| 3,695,057 | 10/1972 | Moisson-Franckhouser | 174/15 CA |
| 4,209,657 | 6/1980 | Inai et al. | 62/514 R |
| 4,218,892 | 8/1980 | Stephens | 62/514 R |

FOREIGN PATENT DOCUMENTS 52-43388 4/1977 Japan.

*Primary Examiner*—Ronald C. Capossela
*Attorney, Agent, or Firm*—Fitch, Even, Tabin, Flannery & Welsh

[57] ABSTRACT

Methods and apparatus are provided for minimizing heat introduced by electrical leads into the cryogenic liquid in which a superconducting magnet is immersed. The electrical leads have normal portions extending from exterior of the cryogenic liquid containment vessel and thereinto and superconducting portions extending vertically downward therefrom and connected to the magnet. Means are provided to lower and raise the level of cryogenic liquid around the superconducting portions of the leads to fully immerse the supercoducting portions during periods of magnet energization and expose selected segments thereof when the magnet is de-energized. When exposed, the non-immersed segments provide a thermal resistance between the normal metal portions and the cryogenic liquid.

10 Claims, 1 Drawing Figure

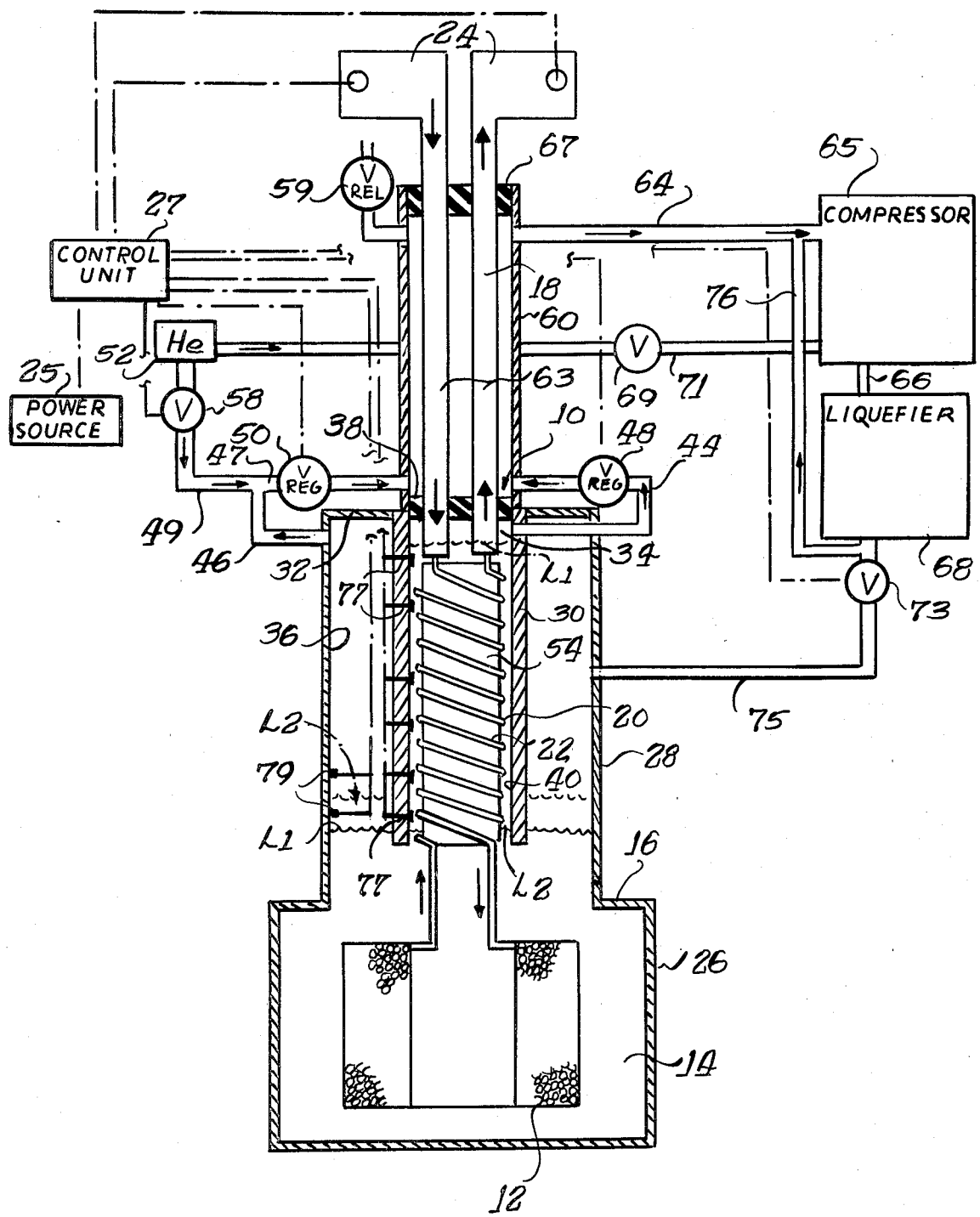

METHODS AND APPARATUS FOR REDUCING HEAT INTRODUCED INTO SUPERCONDUCTING SYSTEMS BY ELECTRICAL LEADS

The present invention relates to cooling systems for superconducting magnets and more particularly to methods and apparatus for reducing the heat transferred into a superconducting magnet containment vessel.

BACKGROUND OF THE INVENTION

An important application of the principle of superconductivity is the creation by superconductive magnets of dissipation-free magnetic fields in the order of 100,000 oersteds or above that are unapproachable by ordinary magnetic means. Superconducting magnets are comprised of windings of superconductive material, i.e., material which exhibits zero electrical resistance below a critical temperature. Because there is no resistive loss in the windings of a superconducting magnet, very high currents may be maintained in the windings producing the high magnetic fields.

Superconductive windings are most commonly formed of NbTi or Nb$_3$Sn although other superconductive materials may be used. Nb$_3$Sn is extremely brittle, and it is normally produced in the form of a very thin layer on ribbons of normal metal, such as niobium or stainless steel, and in this form may be wound into coils. Because superconductive windings are subject to flux jumps which may tend to heat up portions of the windings, superconductive windings are pressed into close contact with a low resistance metal such as copper which shunts portions of the windings that may normalize and thereby protects against precipitous normalization.

Superconductivity requires extremely low temperatures which are attained through the employment of a cryogenic liquid, most commonly liquid helium with a boiling point of 4.2° K. The refrigeration apparatus required to liquefy helium consumes large amounts of energy, and great care is taken to minimize heat transfer to the liquid helium.

A superconducting magnet is immersed in cryogenic liquid within an insulated container or dewar. It is, of course, necessary that the dewar be communicated to the exterior by electrical leads, lines for introducing additional cryogenic liquid, lines for venting vaporized gas and, perhaps, other exterior connections. Such exterior connections are weak points in the thermal barrier provided by the dewar. The electrical leads are particularly at fault in introducing heat into the dewar as they not only conduct exterior heat but produce heat within the dewar as a result of electrical conductance. It would be desirable to reduce heat introduction by electrical leads into cryogenic liquid containment vessels for superconducting apparatus.

SUMMARY OF THE INVENTION

Methods and apparatus are provided for reducing the amount of heat introduced by electrical leads extending into a superconducting magnet containment vessel. Electrical leads include normal metal portions, which extend into the containment vessel, and superconducting portions which extend a vertical distance from the normal metal portions to the superconducting magnet. Means are provided to raise and lower the cryogenic liquid around the superconducting lead portions between a lower level for periods when the superconducting magnet is de-energized and an upper level during magnet energization. When the liquid around the leads is at its lower level, non-immersed segments of the superconducting portions provide thermal resistance between the normal metal portions and the cryogenic liquid, and when the liquid is at its upper level, the superconducting portions are fully immersed and will carry the required current.

BRIEF DESCRIPTION OF THE DRAWING

The FIGURE is a diagrammatic view of superconducting magnet apparatus embodying various features of the invention.

DETAILED DESCRIPTION OF THE PREFERRED EMBODIMENT

In accordance with the present invention, apparatus is provided which reduces the introduction of heat by electrical leads 10 into a containment vessel or dewar 16 in which a superconducting magnet 12 is immersed in cryogenic liquid 14. The electrical leads 10 each include a normal metal portion 18 that extends into the dewar 16 and a superconducting portion 20 that extends a vertical distance downward connecting the normal metal portion to the magnet 12. Adjustment means are provided for changing the surface level of the cryogenic liquid 14 around the leads 10 to fully immerse the superconducting portions 20 when the magnet 12 is energized and expose selected vertical segments 22 of the superconducting portions when the magnet is de-energized, whereby the exposed segments insulate the normal metal portions 18 from the cryogenic liquid.

The containment vessel or dewar 16 is preferably a type commonly used to immerse superconducting magnets 12 having at least a double wall providing a vacuum region therebetween and mirrored wall surfaces. The magnet 12 is disposed in the lower region of the dewar 16 to insure that it is at all times fully covered by the cryogenic liquid 14 preventing accidental destructive normalization of the magnet coils.

The portions 18 of the leads 10 extending externally of the dewar 16 are necessarily formed of normal metal because they cannot practically be maintained at a superconducting temperature. At their outer ends 24, the normal metal portions 18 are connected to an external power source 25 and associated operating circuitry within a central control unit 27. Preferably, the normal metal portions 18 are made of a metal with a high electrical conductivity to thermal conductivity ratio, such as copper in order that the operating current is carried with a minimum heat transfer into the dewar 16.

In order to have the requisite flexibility, the superconducting portions 20 of the leads 10, like the windings of the magnet 12 are formed of normal metal-stablized superconductive material, i.e., superconductive material pressed into close contact with a flexible substrate made of a low resistance metal, such as copper. The superconducting portions 20 may be end portions of the windings of the superconducting magnet 12.

When energized, all of the current is carried by the superconductive material which offers no resistance to current and produces no $I^2R$ heat. When the coiled superconducting lead portions 20 are exposed, they help provide a lengthy thermal barrier from the cryogenic liquid to the exterior of the dewar 16. The superconductive material conducts heat poorly, and the total cross-sectional area of the normal metal substrate and shunt metal is much less than that of the normal metal lead portions 20 and transmits relatively little heat.

To increase the length of the thermal barrier, the superconducting lead portions 20 are, preferably, elongated. In the illustrated embodiment, the superconducting lead portions 20 are coiled around a cylindrical support member 21 which is formed of a low heat-conducting material, such as an epoxy-fiberglass composite. During periods when the magnet 12 is de-energized, the exposed segments 22 of the coiled superconducting portions 20 provide a thermal barrier of a substantial length between the normal lead portions 18 and the surface of the liquid 14.

In the apparatus illustrated in the FIGURE, the magnet 12 is disposed in an enlarged lower cylindrical portion 26, and the superconducting portions 20 of the leads 10 extend vertically through a narrow cylindrical neck 28. The narrow elongated neck 28 provides for substantial vertical spacing between the normal lead portions 18 and the magnet 12 while requiring a relatively small volume of cryogenic liquid 14 to fill the neck.

A tubular partition 30 depends from the upper end 32 of the dewar 16, and when the dewar is filled with cryogenic liquid 14 to a level above the lower end of the partition, a confined gas-containing region 34 above the liquid is defined within the partition, and a separate confined gas-containing region 36 is defined in the neck 28 around the partition. A plug 38, through which the normal lead portions 18 extend, seals off the upper end of the interior passageway 40 of the partition 30, and the relative levels of cryogenic liquid within and without the partition may be adjusted by varying the relative pressures in the gas-containing regions 34, 36.

A first conduit 44 provides communication between the gas-containing region 34 and an exhaust tube 60 above the plug 38. A second conduit 46 leads exterior of the gas-containing region 36 and is connected to a conduit 47 which leads into the exhaust tube 60. The conduits 44, 47 have regulatory valves 48, 50 which limit vapor outflow and thereby determine the pressure in the inner gas-containing region 34 and the outer gas-containing region 36.

As a means of quickly adjusting the liquid level around the superconducting portions 20, the conduit 46 from the outer gas-containing region 36 is connected through a conduit 49 to an external pressurized source 52 of the gas used to form the cryogenic liquid. The conduit 49 has a valve 58 for opening and closing communication between the gas source 52 and the outer gas-containing region 36. The valve 58 from the gas source 52 may be opened to quickly raise the pressure in the outer gas-containing region 36 and quickly raise the level of liquid 14 within the partition 30 immediately prior to energizing the magnet 12. The conduit 49 from the gas source 52, however, is optional because the cryogenic liquid 14, which is constantly vaporizing due to unavoidable heat transfer into the dewar 16, continuously supplies vapor to the gas-containing regions 34, 36.

The exhaust tube 60, extending upward of the plug 38 and around external sections of the normal lead portions 18 vents the conduits 44, 47, and the cold vapor, venting from the dewar 16, cools those segments 63 of the normal lead portions 18 extending through the exhaust tube 60. The upper ends of the normal lead portions 18 pass through the sealed top 67 of the exhaust tube 60, and the vented vapor is carried through a gas return conduit 64 extending from the upper region of the exhaust tube for condensation and recycling through the system by the liquid cryogen supply system. A relief valve 59 is connected to the exhaust tube 60 to prevent the buildup of excess vapor pressure.

The vapor flows through a return conduit 64 for recycling in a compressor 65, and the compressed vapor flows through a conduit 66 to a liquefier 68. The compressor 65 and liquefier 68 maintain a constant supply of cryogenic liquid to replace the liquid lost from the dewar 16 through vaporization. In addition, the external source of the gas 52 is connected to the compressor 65 through a valved 69 conduit 71 to replenish vapor lost from the system as through leakage out of the system. The liquid produced by the liquefier 68 is supplied to the dewar 16 through a valved 73 conduit 75. Any vapor not liquefied in the liquefier 68 is returned through a conduit 76 leading to the suction side of the compressor 65.

Normalization of superconducting circuitry may result in extensive damage thereto, and it is essential that all superconducting circuitry be fully immersed in the cryogenic liquid whenever energized. To ascertain the liquid level within the inner gas-containing region 34, liquid level sensors 77 are preferably disposed at various levels within the partition 30 and connected to the central control unit 27. Liquid level sensors 79 are also disposed at various levels within the outer gas-containing region 36 and connected to control unit 27 and, along with the sensors within the partition 30, are used to ascertain the total volume of liquid within the dewar 16.

In addition to the liquid level sensors 77, 79, the various control valves 48, 50, 58, 69, 73, the power source 25 and the compressor 65 are connected to the control unit 27, whereby the control unit precisely regulates the liquid level within the partition 30 according to whether or not the magnet 12 is energized. When a known volume of liquid 14 is contained within the dewar 16, the desired liquid level within the partition 30 is determined by the relative vapor pressures in the inner and outer gas-containing regions 34, 36. The control unit 27 actuates the valves 48, 50, 58, according to the liquid levels within and around the partition 30 as ascertained by the sensors 77, 79. The control unit 27 also actuates the compressor 65 and the valve 69 in the conduit 71 from the gas source 52 to assure a replenishing supply of cryogenic liquid. If the total volume of liquid 14 within the dewar 16 falls below a predetermined amount as determined by the sensors 77, 79, the valve 73 from the compressor 65 is opened to supply additional liquid to the dewar.

When the magnet 12 is to be energized, the valve 48 is automatically adjusted to maintain a lower pressure in the inner gas-containing region 34, the valve 50 is adjusted to maintain a higher pressure in the outer gas-containing region 36 and the valve 58 is momentarily opened to provide a quick influx of gas into the outer gas-containing region to effect a quick level adjustment. By appropriate adjustment of the valves 48, 50, the liquid level within the partition 34 is brought to a level L1 above the upper end of the superconducting lead portions 20. It is necessary that the entire superconducting portions 20 be covered in order to be superconducting throughout, but it is preferred that only the lower tips of the normal lead portions 18 be covered to minimize heat transfer therefrom. The control unit 27 is programmed to energize the magnet 12 only when the liquid level sensors 77 determine that the liquid level within the partition 30 is above the lower tips of the normal metal lead portions 18.

After the magnet 12 is de-energized, the valve 50 is adjusted to lower the vapor pressure in the outer gas-containing region 36 while the valve 48 is adjusted to allow the pressure in the inner gas-containing region 34 to increase. By appropriate adjustment of the relative pressures in the gas-containing regions 34, 36 the level of cryogenic liquid within the partition 30 is lowered to a level L2 just above the lower end of the partition while the level of cryogenic liquid around the partition correspondingly rises.

While the invention has been described in terms of a preferred embodiment, modifications obvious to one with ordinary skill in the art may be made without departing from the scope of the present invention. Various alternate means may be employed to raise or lower the liquid level around the superconducting portion of the leads. In an apparatus such as hereinabove described, an external pressurized gas sources associated with each gas-containing region may be employed to quickly raise and lower the liquid level. Heat sources within the dewar, momentarily activated, will quickly vaporize sufficient cryogenic liquid to provide the gas volume needed to change liquid levels in the respective gas-containing regions. In a simple dewar arrangement, without separate gas-containing regions, cryogenic liquid may be pumped from and into the dewar to adjust the liquid level around the leads.

Various features of the invention are set forth in the following claims.

What is claimed is:

1. In combination,
    a superconducting magnet and cooling apparatus therefor, said cooling apparatus comprising:
    a containment vessel for cryogenic liquid, said superconducting magnet being disposed within said containment vessel;
    electrical leads connected at a lower end to said superconducting magnet and extending a vertical distance thereabove within said containment vessel and exterior of said containment vessel for connection to an external power source, said electrical leads having superconductive portions; and
    level adjustment means to alternately lower and raise the level of cryogenic liquid within said vessel around said leads between a lower level, at which selected superconductive segments of said leads within said containment vessel lie above the cryogenic liquid providing thermally insulating barriers between said cryogenic liquid and exteriorly extending lead segments, and an upper level, at which said selected superconductive segments are immersed in cryogenic liquid and are electrically superconducting.

2. Apparatus according to claim 1 wherein said selected segments of said leads are formed of normal metal-stabilized superconductive material.

3. Apparatus according to claim 1 or claim 2 wherein said leads have normal metal portions connected to said selected segments, said normal portions extending exterior of said containment vessel.

4. Apparatus according to claim 1 wherein said selected segments are coiled providing a lengthy heat transfer pathway between said magnet and the exterior of said vessel.

5. Apparatus according to claim 1 also including partition means in the upper end of said containment vessel extending into the cryogenic liquid to define a first confined gas-containing region through which said selected segments of said leads extend and a second confined gas-containing region,
    a vapor conduit venting said first gas region and valve means in said conduit for determining the vapor pressure in said first gas-containing region,
    a vapor conduit venting said second gas-containing region and valve means in said conduit for determining the vapor pressure in said second gas-containing region, and
    control means for actuating said valve means to adjust the relative vapor pressure in said first and second gas-containing regions thereby raising and lowering the surface level of the cryogenic liquid within said first gas-containing region.

6. Apparatus according to claim 5 including a vapor exhaust tube connected to at least one of said vapor conduits and surrounding exterior segments of said leads, whereby the vapor from said conduit cools the segments of said leads within said vapor exhaust tube.

7. Apparatus according to claim 1 including:
    automatic control means connected to said level adjustment means for actuating said level adjustment means, and
    sensor means disposed within said containment vessel for ascertaining the liquid level around said selected segments, said sensor means connection to said control means whereby said control means actuates said adjustment means according to the ascertained liquid level.

8. A method of operating a superconducting magnet comprising:
    providing a superconducting magnet having leads which are connected to a power source, said leads having superconducting portions,
    disposing said magnet in a containment vessel so that said superconducting lead portions extend upward from said magnet within said containment vessel and portions of said leads extend exterior of said containment vessel,
    supplying cryogenic liquid into said containment vessel to immerse said superconducting magnet, and
    alternately varying the level of said liquid within said vessel around said leads to immerse selected superconducting segments of said leads when said magnet is energized and to expose said selected superconducting segments of said leads when said magnet is de-energized so that said exposed segments provide a thermal barrier between said liquid and said exteriorly-extending lead portions.

9. A method according to claim 8 including:
    providing a first upper gas-containing region, through which said leads extend, and a second upper gas-containing region, and
    adjusting the relative vapor pressures in said first and second gas-containing regions to adjust the level of said liquid in said first gas-containing region.

10. A method according to claim 8 including providing leads having a normal portion extending exterior of said containment vessel, said superconducting portion extending a vertical distance downward therefrom.

* * * * *